(12) United States Patent
Lennox et al.

(10) Patent No.: US 11,402,876 B1
(45) Date of Patent: Aug. 2, 2022

(54) PROTECTIVE COMPUTER CASE

(71) Applicants: Rob Lennox, Clarkston, MI (US); Brent Alexander, Clarkston, MI (US)

(72) Inventors: Rob Lennox, Clarkston, MI (US); Brent Alexander, Clarkston, MI (US)

(*) Notice: Subject to any disclaimer, the term of this patent is extended or adjusted under 35 U.S.C. 154(b) by 45 days.

(21) Appl. No.: 17/087,699

(22) Filed: Nov. 3, 2020

Related U.S. Application Data

(60) Provisional application No. 63/075,353, filed on Sep. 8, 2020.

(51) Int. Cl.
*A47B 81/00* (2006.01)
*G06F 1/16* (2006.01)

(52) U.S. Cl.
CPC .................. *G06F 1/1656* (2013.01)

(58) Field of Classification Search
CPC .................................................... G06F 1/1656
See application file for complete search history.

(56) References Cited

U.S. PATENT DOCUMENTS

| | | | |
|---|---|---|---|
| 8,662,269 B2* | 3/2014 | Shor | A45C 13/02 190/110 |
| 2005/0284791 A1* | 12/2005 | Sadow | A45C 13/021 206/320 |
| 2014/0049910 A1* | 2/2014 | Lai | G06F 1/1616 361/679.58 |
| 2020/0150727 A1* | 5/2020 | Ho | G06F 1/1616 |
| 2021/0240225 A1* | 8/2021 | Kort | H01R 13/516 |
| 2021/0267334 A1* | 9/2021 | Botdorf | A45C 13/005 |

* cited by examiner

*Primary Examiner* — Matthew W Ing

(57) ABSTRACT

The protective computer case is configured for use with a notebook computer. The notebook computer is a rotating structure. The protective computer case forms a protected space around the notebook computer. The protected space is such that the notebook computer can rotate while the protective computer case provides the protected space. The protective computer case incorporates a display shell and a digital shell. The display shell forms a protected space around the notebook computer. The digital shell forms a forms a protected space around the notebook computer. The notebook computer inserts into the display shell. The notebook computer inserts the digital shell.

6 Claims, 10 Drawing Sheets

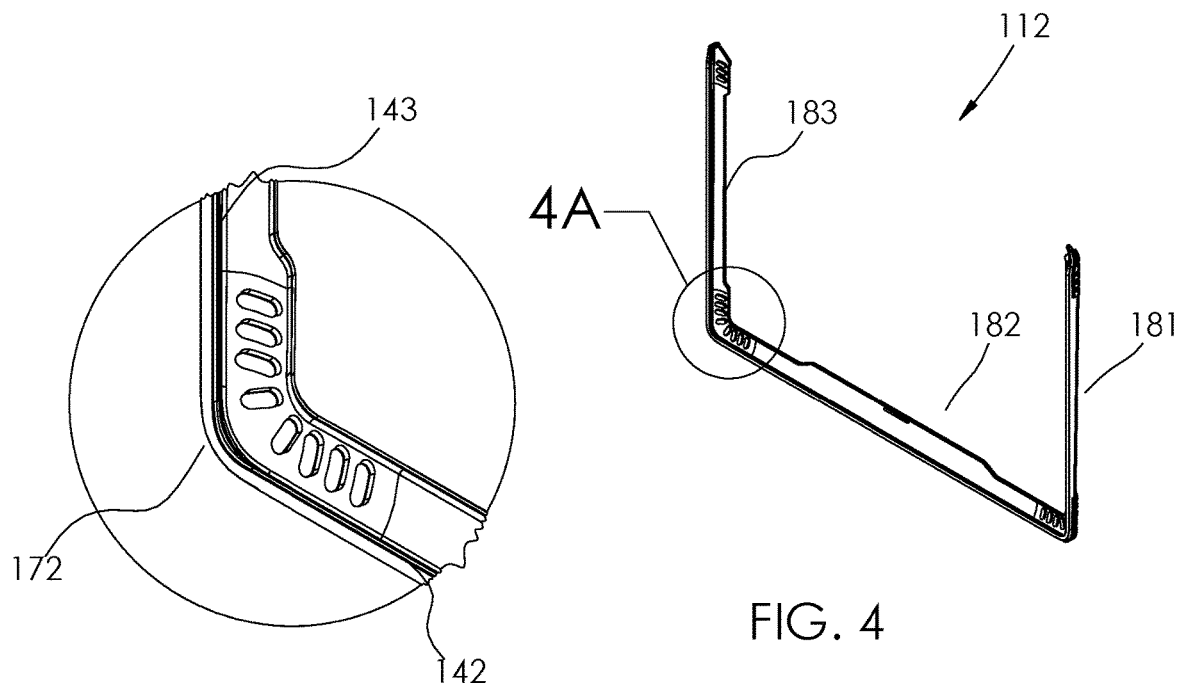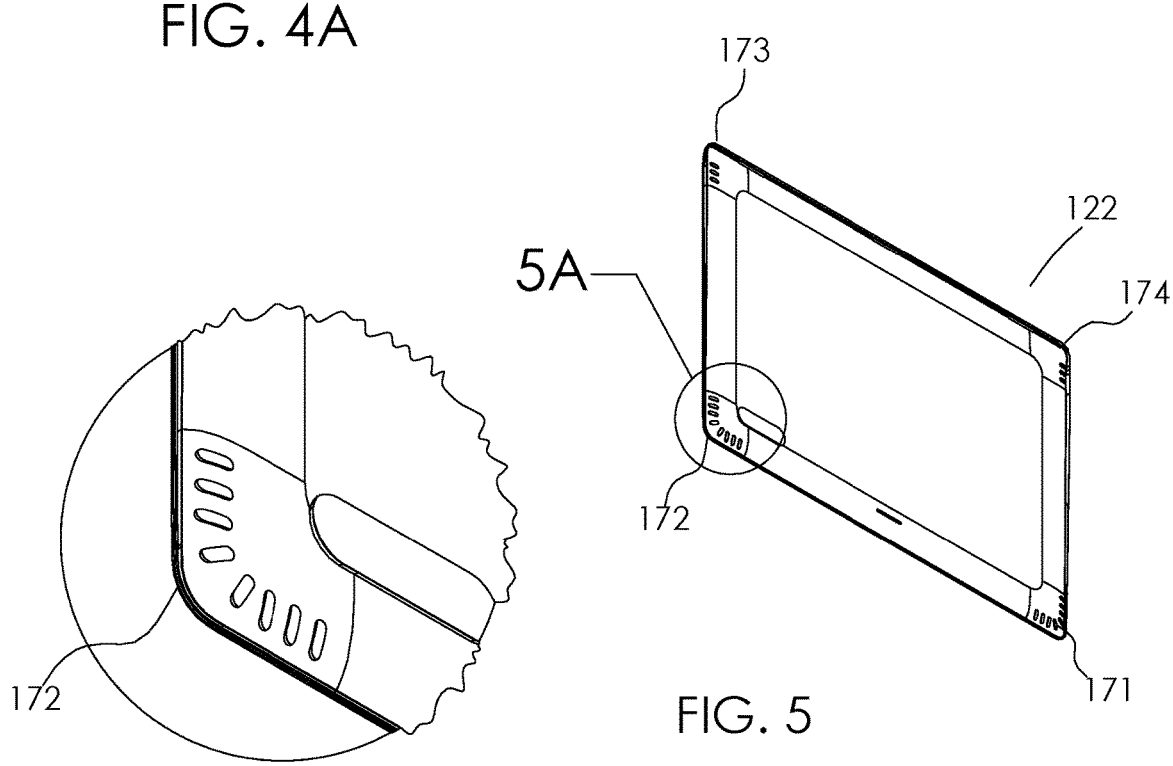

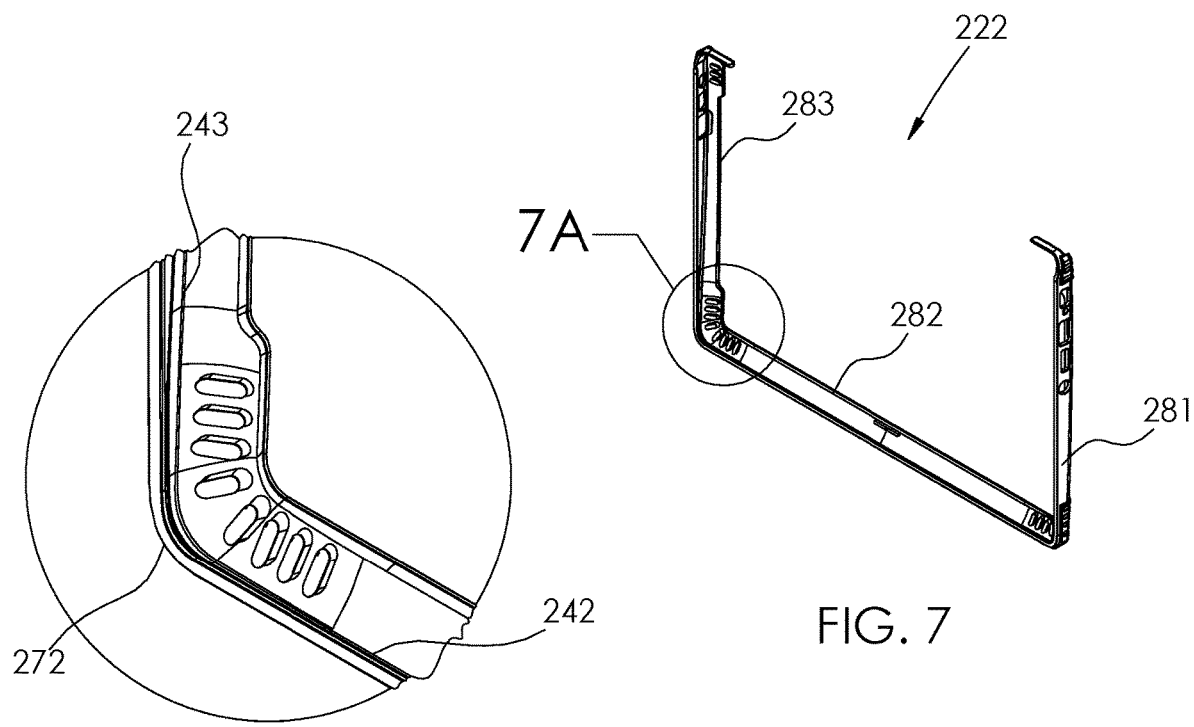
FIG. 7A
FIG. 7
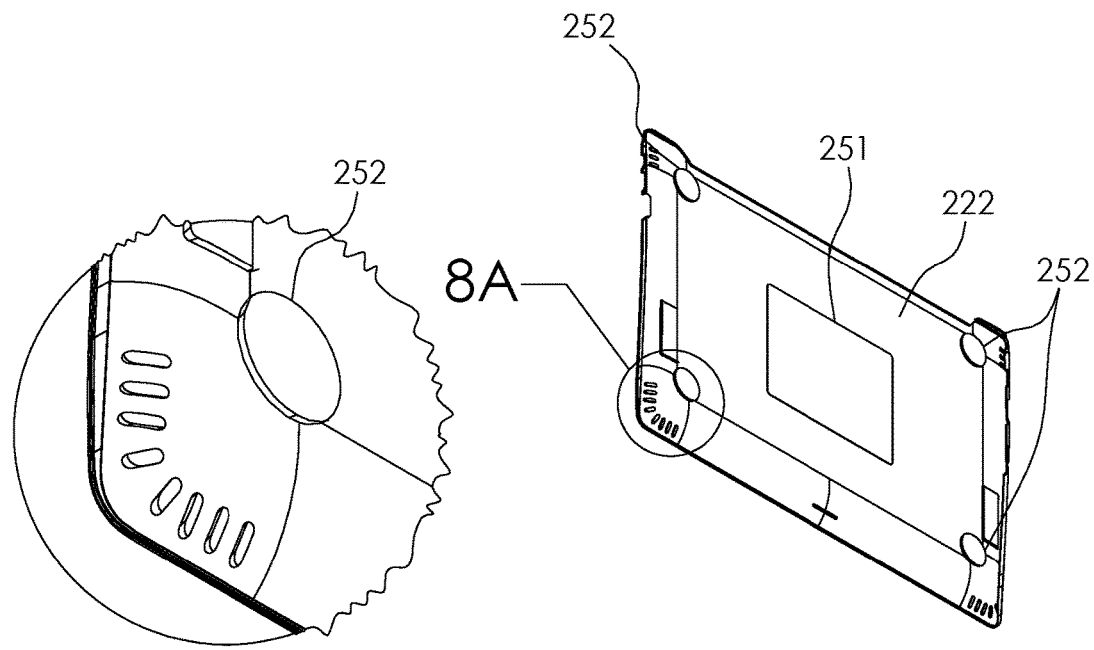
FIG. 8A
FIG. 8

PROTECTIVE COMPUTER CASE

CROSS REFERENCES TO RELATED APPLICATIONS

This non-provisional utility patent application claims priority to provisional application 63/075,353 that was filed on Sep. 8, 2020 by the applicants Robert Lennox and Brent Alexander.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric digital data processing including construction details not covered by groups G06F3/00-G06F13/00 and G06F21/00, more specifically, a constructional detail for a portable computer. (G06F1/1613)

SUMMARY OF INVENTION

The protective computer case is configured for use with a notebook computer. The notebook computer further comprises a display module, a digital module, and a hinge. The hinge attaches the display module to the digital module such that the display module rotates relative to the digital module. The protective computer case forms a protected space that encloses the display module. The protective computer case forms a protected space that encloses the digital module. The protective computer case simultaneously encloses the display module and the digital module such that the display module continues to rotate relative to the digital module while the display module and the digital module are protected by the protective computer case.

The protective computer case comprises a display shell and a digital shell. The display shell forms a protected space around the display module. The digital shell forms a protected space around the digital module. The display shell comprises a first plurality of infinite channel edges that secure the display module within the display shell. The digital shell comprises a second plurality of infinite channel edges that secure the digital module within the digital shell.

The notebook computer, the display module, the digital module, the hinge, and the protected space are defined elsewhere in this disclosure.

These together with additional objects, features and advantages of the protective computer case will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective computer case in detail, it is to be understood that the protective computer case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective computer case.

It is therefore important that the claims be regarded as including such equivalent construction insofar as they do not depart from the spirit and scope of the protective computer case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a perspective view of an embodiment of the disclosure.

FIG. 4A is a detail view of an embodiment of the disclosure.

FIG. 5 is a perspective view of an embodiment of the disclosure.

FIG. 5A is a detail view of an embodiment of the disclosure.

FIG. 7 is a perspective view of an embodiment of the disclosure.

FIG. 7A is a detail view of an embodiment of the disclosure.

FIG. 8 is a perspective view of an embodiment of the disclosure.

FIG. 8A is a detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
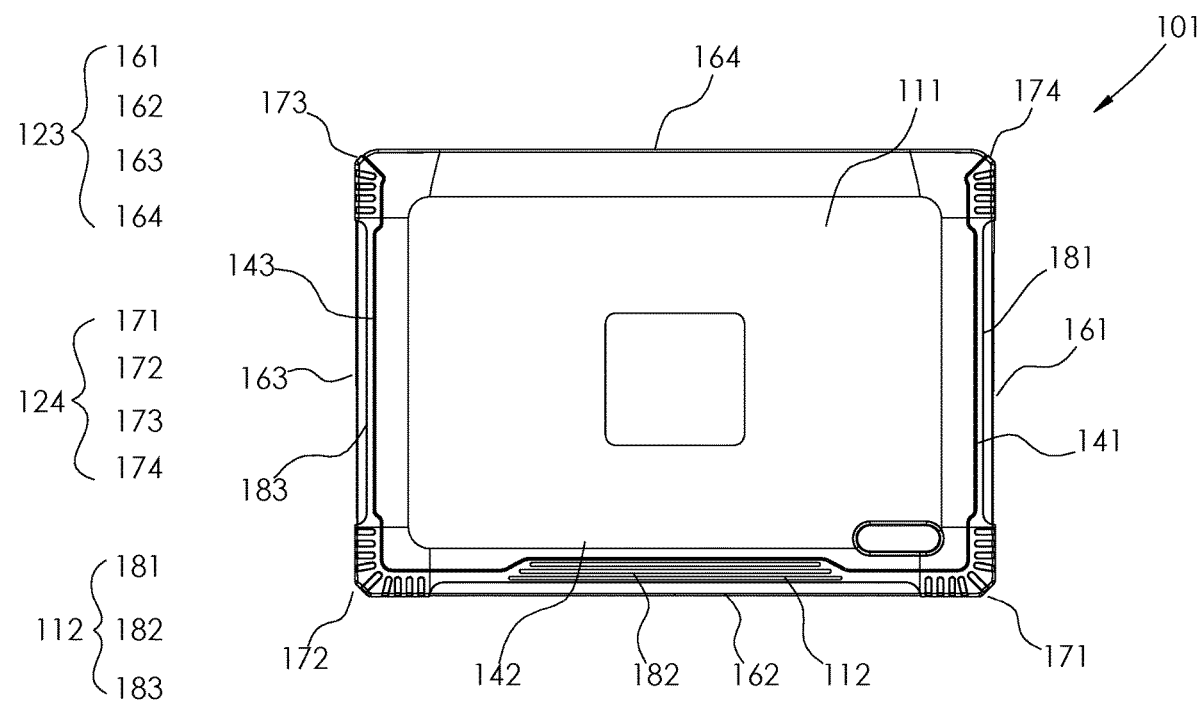
FIG. 1 is a front view of an embodiment of the disclosure.
Figure 2:
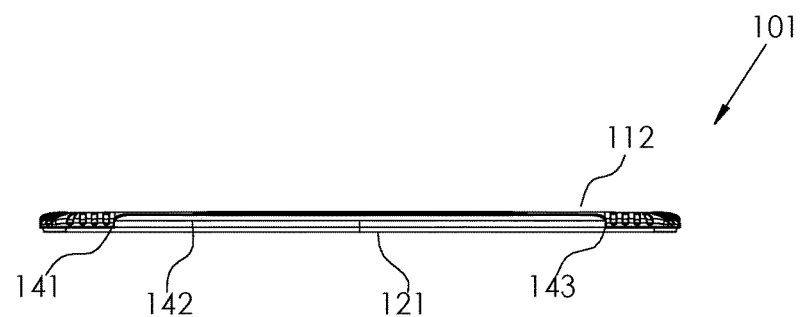
FIG. 2 is a bottom view of an embodiment of the disclosure.
Figure 3:
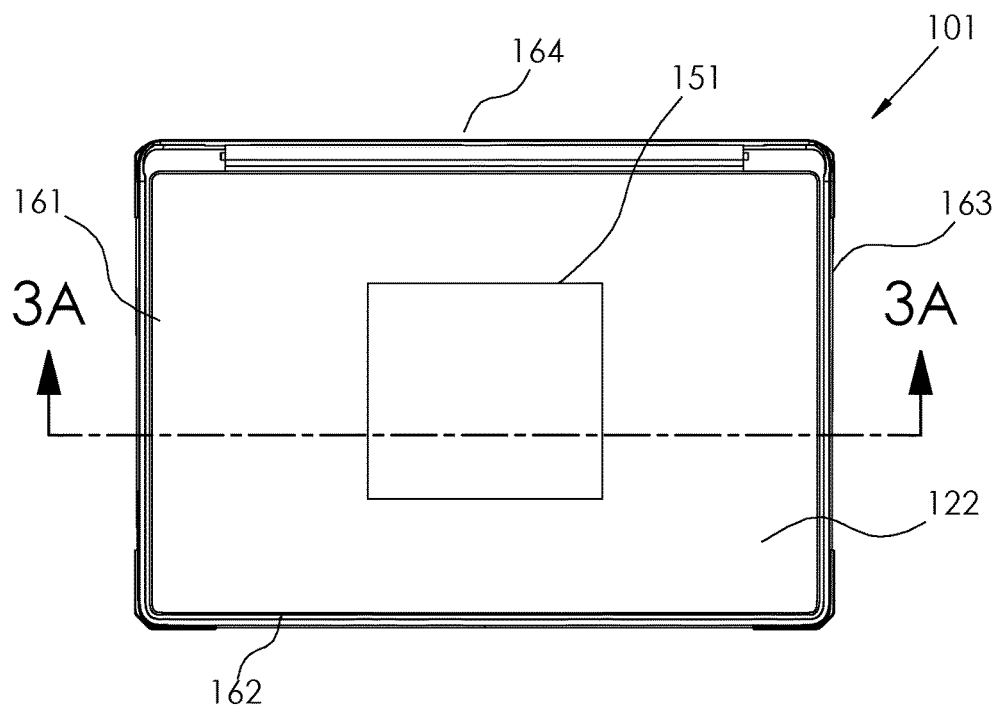
FIG. 3 is a back view of an embodiment of the disclosure.
Figure 3A:
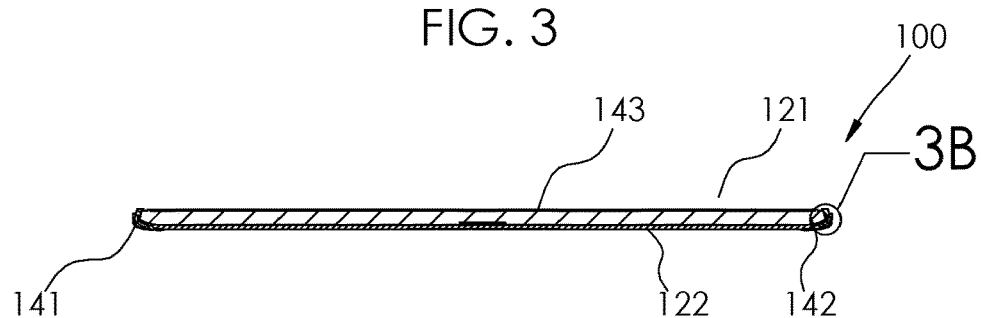
FIG. 3A is a cross-sectional view of an embodiment of the disclosure across 3A-3A as shown on FIG. 3.
Figure 3B:
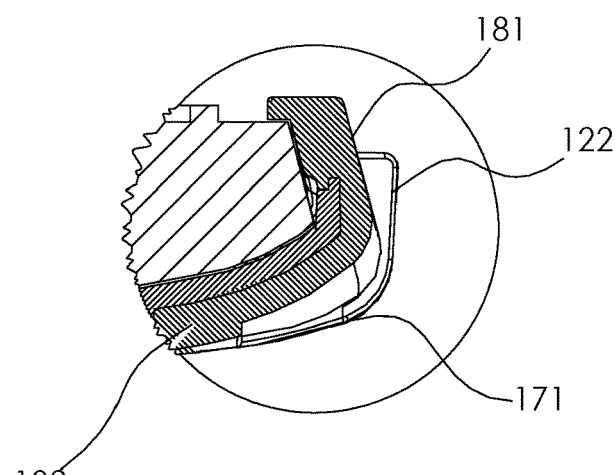
FIG. 3B is a detail view of an embodiment of the disclosure.
Figure 6:
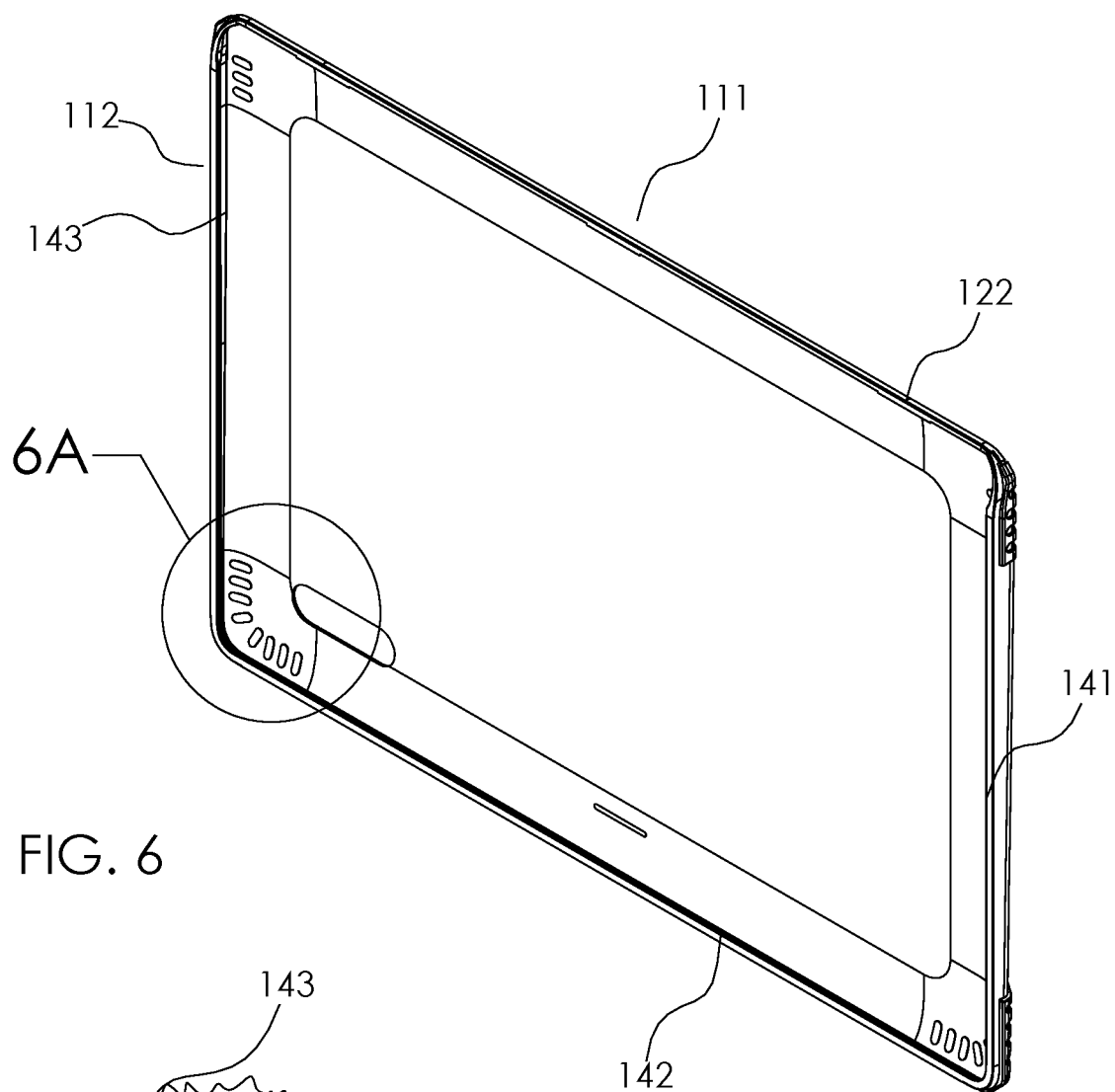
FIG. 6 is a perspective view of an embodiment of the disclosure.
Figure 6A:
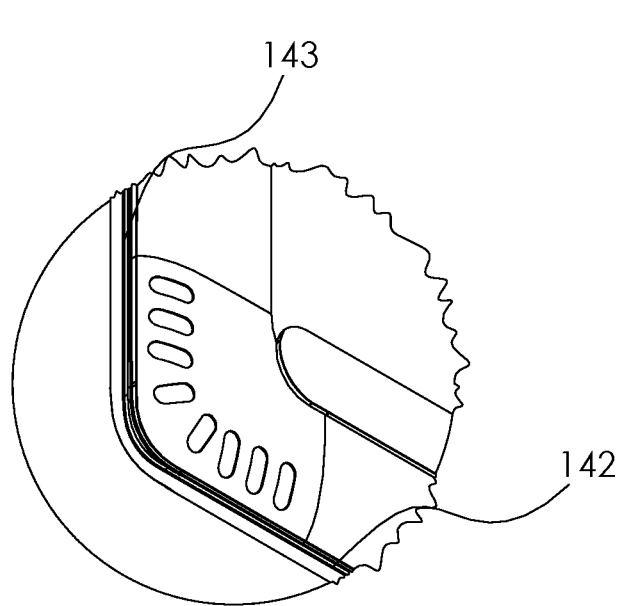
FIG. 6A is a detail view of an embodiment of the disclosure.
Figures 9, 9A:
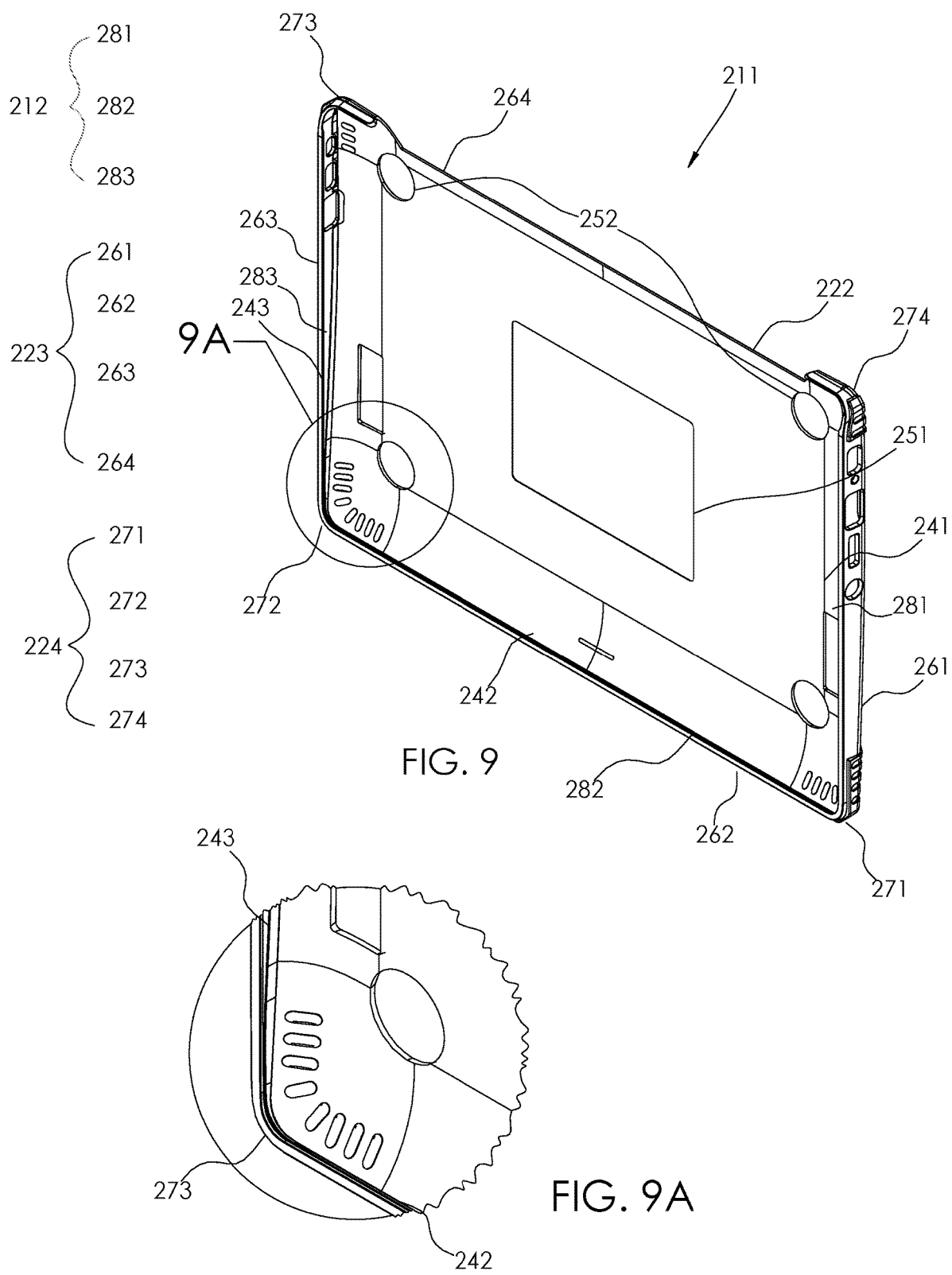
FIG. 9 is a perspective view of an embodiment of the disclosure.
FIG. 9A is a detail view of an embodiment of the disclosure.
Figure 10:
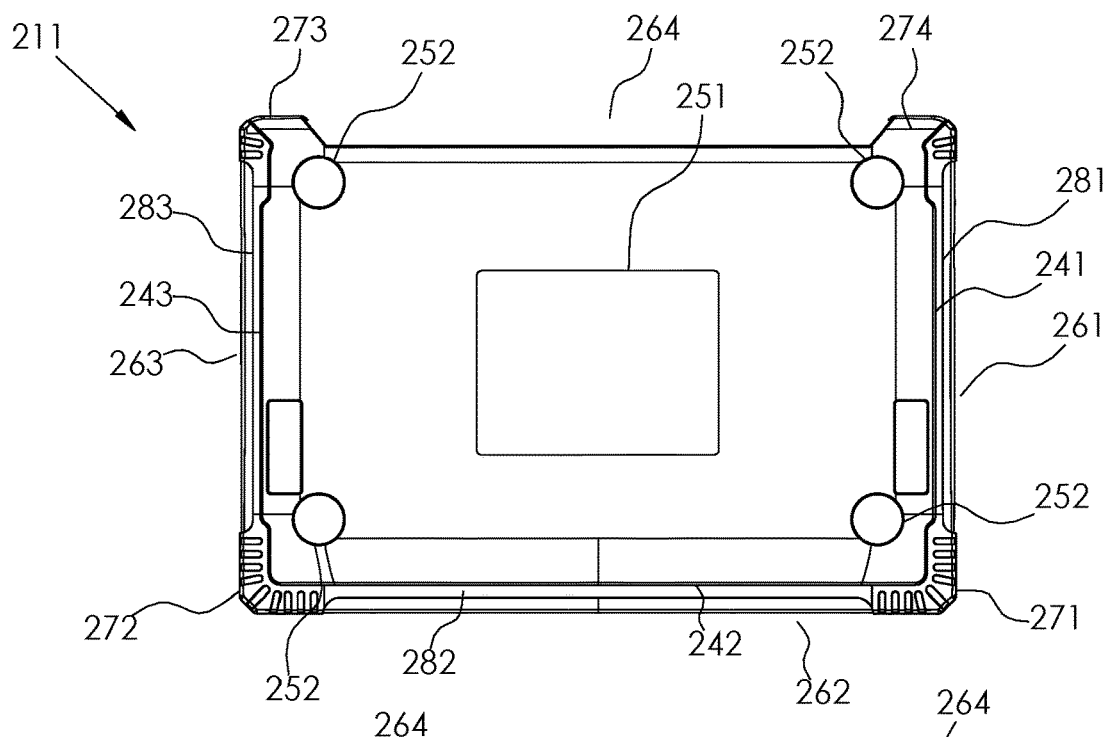
FIG. 10 is a front view of an embodiment of the disclosure.
Figure 11:
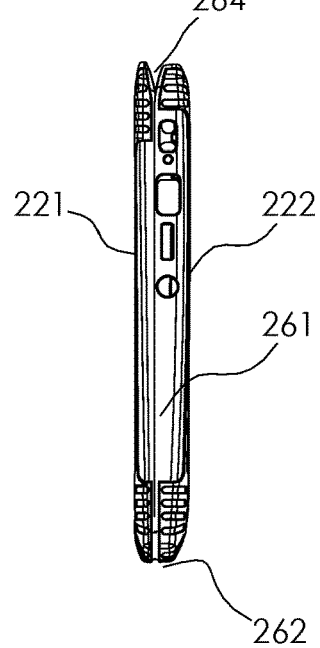
FIG. 11 is a side view of an embodiment of the disclosure.
Figure 12:
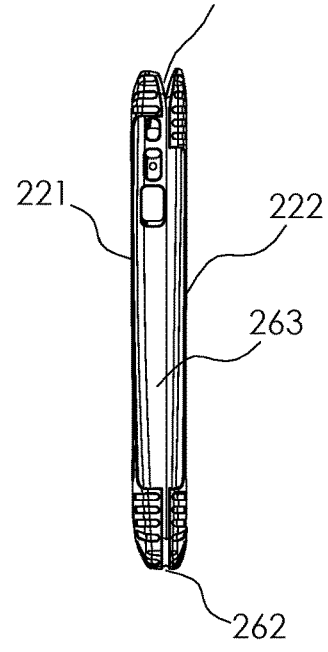
FIG. 12 is a reverse side view of an embodiment of the disclosure.
Figure 13:
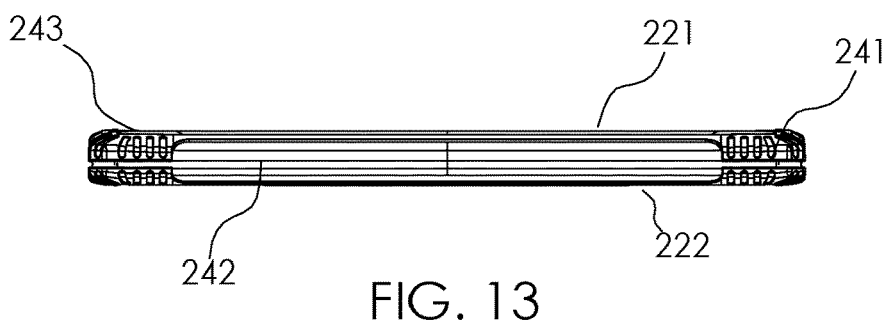
FIG. 13 is a bottom view of an embodiment of the disclosure.
Figure 14:
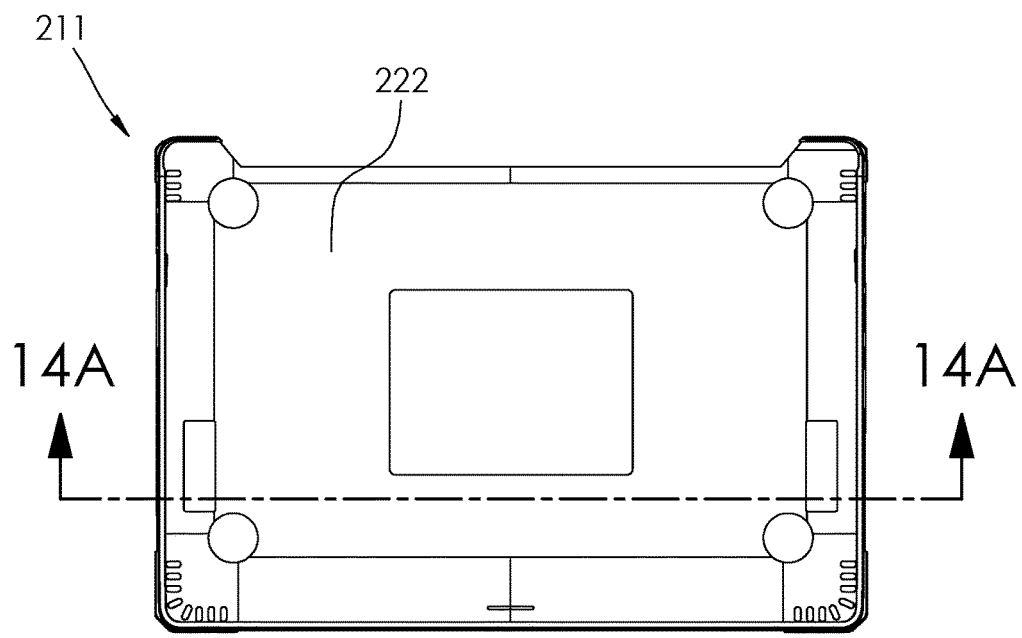
FIG. 14 is a rear view of an embodiment of the disclosure.
Figure 14A:
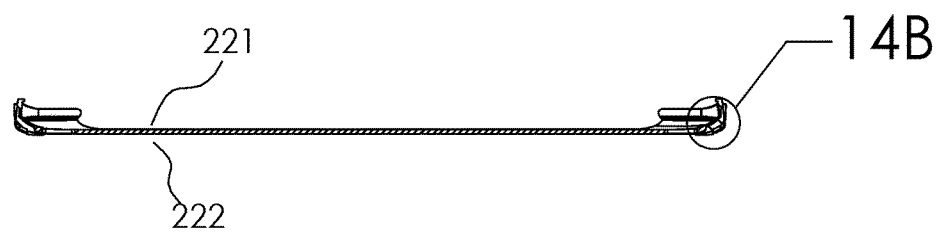
FIG. 14A is a detail view of an embodiment of the disclosure.
Figure 14B:
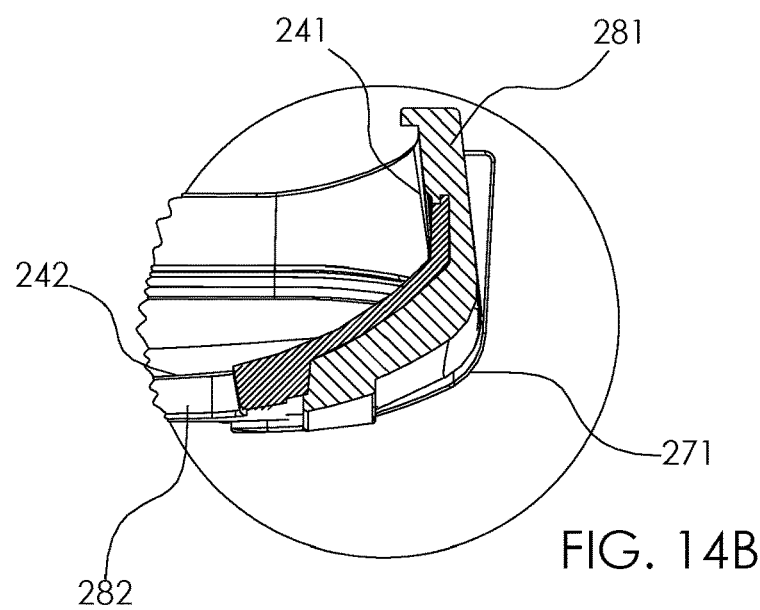
FIG. 14B is a detail view of an embodiment of the disclosure.
Figure 15:
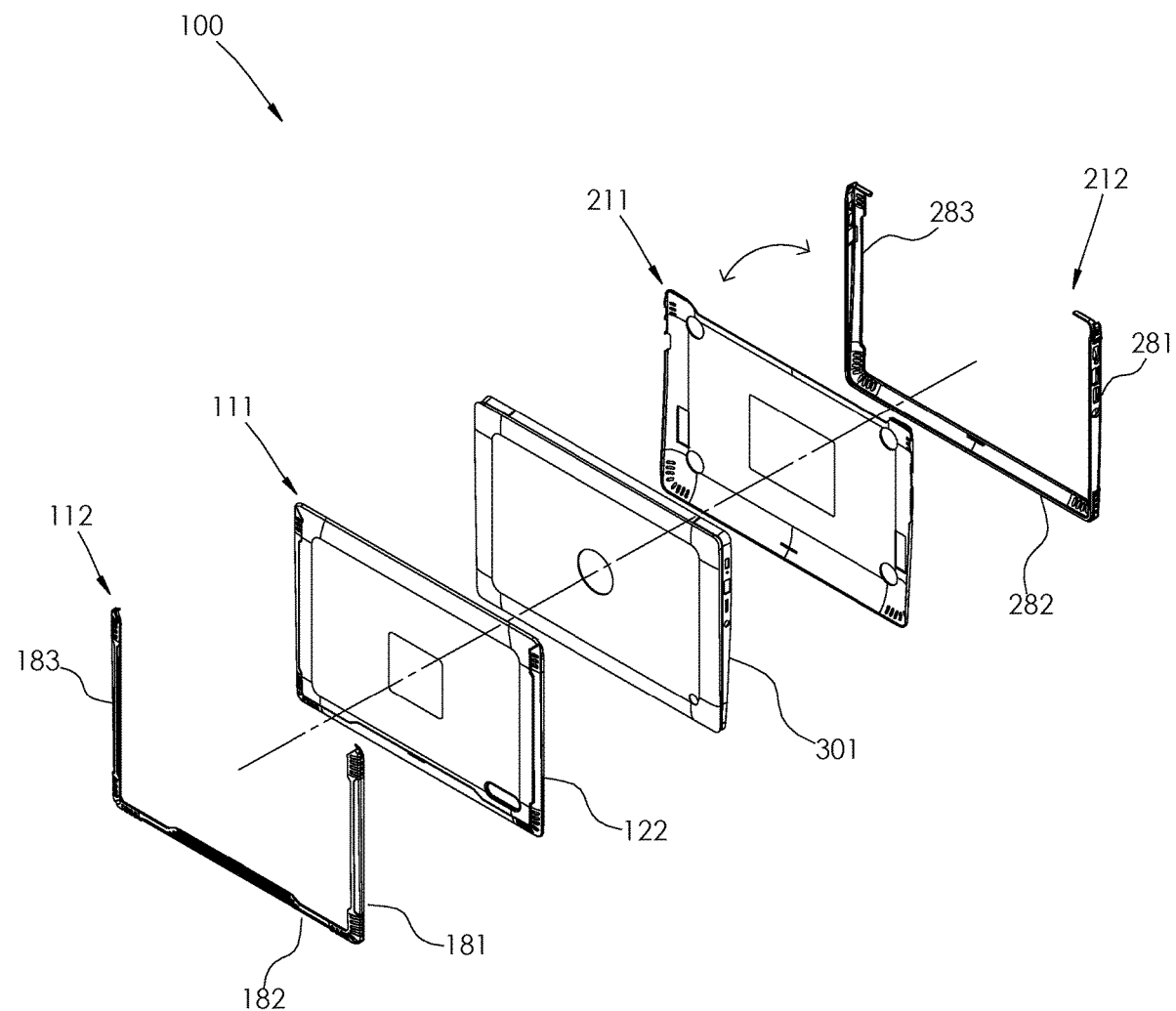
FIG. 15 is an exploded view of an embodiment of the disclosure.
Figure 16:
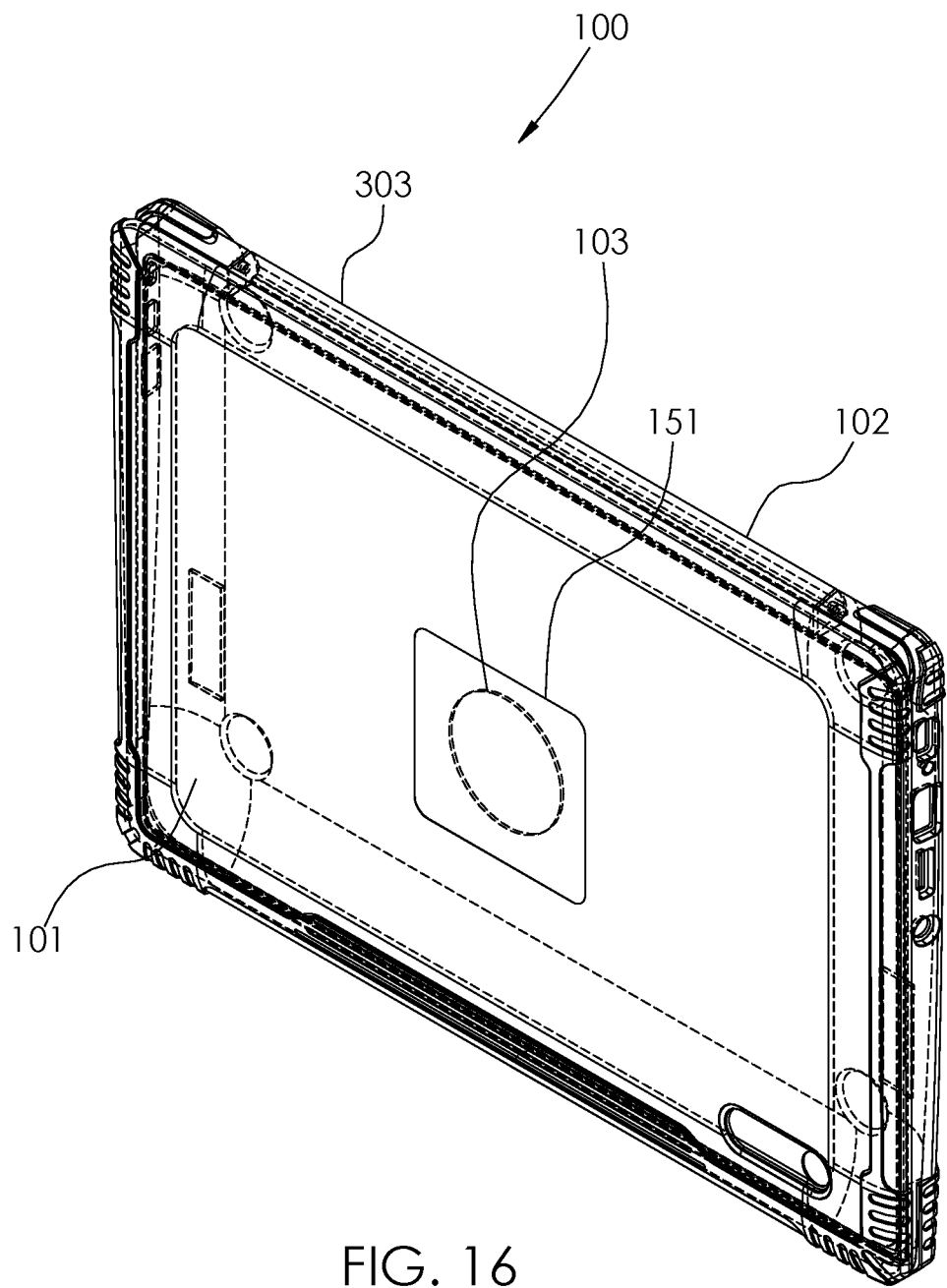
FIG. 16 is an in-use view of an embodiment of the disclosure.

Detailed reference will now be made to one or more potential embodiments of the disclosure, which are illustrated in FIGS. 1 through 16.

The protective computer case 100 (hereinafter invention) is configured for use with a notebook computer 103. The notebook computer 103 further comprises a display module 301, a digital module 302, and a hinge 303. The hinge 303 attaches the display module 301 to the digital module 302 such that the display module 301 rotates relative to the digital module 302. The invention 100 forms a protected space that encloses the display module 301. The invention 100 forms a protected space that encloses the digital module 302. The invention 100 simultaneously encloses the display module 301 and the digital module 302 such that the display module 301 continues to rotate relative to the digital module 302 while the display module 301 and the digital module 302 are protected by the invention 100.

The invention 100 comprises a display shell 101 and a digital shell 102. The display shell 101 forms a protected space around the display module 301. The digital shell 102 forms a protected space around the digital module 302. The display shell 101 comprises a first plurality of infinite channel edges that secure the display module 301 within the display shell 101. The digital shell 102 comprises a second plurality of infinite channel edges that secure the digital module 302 within the digital shell 102.

The notebook computer 103 is a personal data device. The hinge 303 is the mechanical structure that attaches the display module 301 to the digital module 302 such that the display module 301 rotates relative to the digital module 302. The notebook computer 103 is a rotating device that is protected by the display shell 101 and the digital shell 102. The notebook computer 103, the display module 301, the digital module 302, the hinge 303, and the protected space are defined elsewhere in this disclosure.

The display shell 101 forms the protected space that encloses the display module 301 of the notebook computer 103. The display module 301 inserts into the display shell 101. The display shell 101 is a rigid structure. The display shell 101 contains the display module 301. The display shell 101 is formed with all apertures and form factors necessary to allow the display shell 101 to accommodate the use and operation of the display module 301 and the notebook computer 103. Methods to form a display shell 101 suitable for the purposes described in this disclosure are well-known and documented in the mechanical arts. The display shell 101 comprises a display pan 111, a plurality of display ledges 112, a first display infinite channel edge 141, a second display infinite channel edge 142, and a third display infinite channel edge 143.

The display pan 111 is a prism-shaped structure. The display pan 111 has a semi-enclosed pan structure. The display pan 111 is a rigid structure. The display pan 111 forms the boundaries of the protected space that encloses the display module 301. The display pan 111 comprises a display open face 121, a display closed face 122, a plurality of display lateral faces 123, and a plurality of display vertices 124.

The display open face 121 is the open face of the semi-enclosed pan structure of the display pan 111.

The display closed face 122 is the closed face of the semi-enclosed pan structure of the display pan 111. The display closed face 122 is the face of the prism structure of the display pan 111 that is distal from the display open face 121. The display closed face 122 further comprises a display asset tracking window 151. The display asset tracking window 151 is a transparent structure that is formed through the display closed face 122 of the display pan 111. The display asset tracking window 151 provides visibility to the exterior surface of the display module 301 such that any inventory tags applied to the notebook computer 103 are readily visible through the display asset tracking window 151.

Each of the plurality of display lateral faces 123 is a lateral face of the prism structure of the display pan 111. Each of the plurality of display lateral faces 123 forms a face between the display open face 121 and the display closed face 122 of the display pan 111. The plurality of display lateral faces 123 comprises a first closed display lateral face 161, a second closed display lateral face 162, a third closed display lateral face 163, and a display open lateral face 164.

The first closed display lateral face 161 forms a closed lateral face of the semi-enclosed pan structure of the display pan 111. The first closed display lateral face 161 is positioned between the display open lateral face 164 and the second closed display lateral face 162 of the display pan 111.

The second closed display lateral face 162 forms a closed lateral face of the semi-enclosed pan structure of the display pan 111. The second closed display lateral face 162 is positioned between the first closed display lateral face 161 and the third closed display lateral face 163 of the display pan 111.

The third closed display lateral face 163 forms a closed lateral face of the semi-enclosed pan structure of the display pan 111. The third closed display lateral face 163 is positioned between the second closed display lateral face 162 and the display open lateral face 164 of the display pan 111.

The display open lateral face 164 forms the open face of the semi-enclosed pan structure of the display pan 111. The display module 301 inserts into the display shell 101 through the display open lateral face 164.

Each of the plurality of display vertices 124 is a vertex of the prism structure that forms the display pan 111. The plurality of display vertices 124 is a brink formed at a joint formed by the display open face 121, the display closed face 122, and two lateral faces selected from the plurality of display lateral faces 123. The plurality of display vertices comprises a first display vertex 171, a second display vertex 172, a third display vertex 173, and a fourth display vertex 174.

The first display vertex 171 is the vertex formed at the brink formed by the display closed face 122, the first closed display lateral face 161, the second closed display lateral face 162, the first display ledge 181, and the second display ledge 182. The second display vertex 172 is the vertex formed at the brink formed by the display closed face 122, the second closed display lateral face 162, the third closed display lateral face 163, the second display ledge 182, and the third display ledge 183. The third display vertex 173 is the vertex formed at the brink formed by the display closed face 122, the third closed display lateral face 163, and the display open lateral face 164. The fourth display vertex 174 is the vertex formed at the brink formed by the display closed face 122, the display open lateral face 164, and the first closed display lateral face 161.

Each of the plurality of display ledges 112 is a disk-shaped structure. Each of the plurality of display ledges 112 attaches to the plurality of display lateral faces 123 of the display pan 111. Each of the plurality of display ledges 112 forms an undercut ledge. The ledge and the undercut ledge are defined elsewhere in this disclosure. The plurality of display ledges 112 projects into the display open face 121 of the semi-enclosed pan structure of the display pan 111 such that the plurality of display ledges 112 form physical barriers that contain the display module 301 within the display pan 111. The plurality of display ledges 112 comprises a first display ledge 181, a second display ledge 182, and a third display ledge 183.

The first display ledge 181 is the ledge structure selected from the plurality of display ledges 112 that is associated with the first closed display lateral face 161. The first display ledge 181 attaches to the free end of the first closed display lateral face 161. The first display ledge 181 projects perpendicularly away from the face of the first closed display lateral face 161 towards the center of the display open face 121 of the display pan 111. The first display ledge 181 is an elastic structure such that the first display ledge 181 deforms when the display module 301 inserts into the first display infinite channel edge 141. The return of the first display ledge 181 to its relaxed shape secures the display module 301 within the first display infinite channel edge 141.

The second display ledge 182 is the ledge structure selected from the plurality of display ledges 112 that is associated with the second closed display lateral face 162. The second display ledge 182 attaches to the free end of the second closed display lateral face 162. The second display ledge 182 projects perpendicularly away from the face of the second closed display lateral face 162 towards the center of the display open face 121 of the display pan 111. The second display ledge 182 is an elastic structure such that the second display ledge 182 deforms when the display module 301 inserts into the second display infinite channel edge 142. The return of the second display ledge 182 to its relaxed shape secures the display module 301 within the second display infinite channel edge 142.

The third display ledge 183 is the ledge structure selected from the plurality of display ledges 112 that is associated with the third closed display lateral face 163. The third display ledge 183 attaches to the free end of the third closed display lateral face 163. The third display ledge 183 projects perpendicularly away from the face of the third closed display lateral face 163 towards the center of the display open face 121 of the display pan 111. The third display ledge 183 is an elastic structure such that the third display ledge 183 deforms when the display module 301 inserts into the third display infinite channel edge 143. The return of the third display ledge 183 to its relaxed shape secures the display module 301 within the third display infinite channel edge 143.

The first display infinite channel edge 141 is an infinite channel edge that is formed between the first display vertex 171 and the fourth display vertex 174 of the display pan 111. The first display infinite channel edge 141 is an elastic structure. The first display infinite channel edge 141 has the structure of an illiterate c-channel. The first display infinite channel edge 141 is bounded by the display closed face 122, the first closed display lateral face 161, and the first display ledge 181. The display module 301 inserts between the display closed face 122 along a first face of the display module 301 and the first display ledge 181.

The first display infinite channel edge 141 acts as a spring. Specifically, when a display module 301 of the notebook computer 103 inserts into the hollow interior of the first display infinite channel edge 141, the first display ledge 181, and the first closed display lateral face 161 deform such in a direction such that the inner diameter of the prism structure of the first display infinite channel edge 141 increases. The first display ledge 181 and the first closed display lateral face 161 applies a counterforce that attempts to return the first display infinite channel edge 141 to its original positions. When the display module 301 of the notebook computer 103 inserts into the first display infinite channel edge 141, the first display infinite channel edge 141 applies a pressure against the display module 301 of the notebook computer 103 that effectively attaches the first display infinite channel edge 141 to the display module 301 of the notebook computer 103.

In the first potential embodiment of the disclosure, the first display ledge 181 and the first closed display lateral face 161 are formed from a thermoplastic elastomeric polymer.

The second display infinite channel edge 142 is an infinite channel edge that is formed between the first display vertex 171 and the second display vertex 172 of the display pan 111. The second display infinite channel edge 142 is an elastic structure. The second display infinite channel edge 142 has the structure of an illiterate c-channel. The second display infinite channel edge 142 is bounded by the display closed face 122, the second closed display lateral face 162, and the second display ledge 182. The display module 301 inserts between the display closed face 122 along a first face of the display module 301 and the second display ledge 182.

The second display infinite channel edge 142 acts as a spring. Specifically, when a display module 301 of the notebook computer 103 inserts into the hollow interior of the second display infinite channel edge 142, the second display ledge 182, and the second closed display lateral face 162 deform such in a direction such that the inner diameter of the prism structure of the second display infinite channel edge 142 increases. The second display ledge 182 and the second closed display lateral face 162 applies a counterforce that attempts to return the second display infinite channel edge 142 to its original positions. When the display module 301 of the notebook computer inserts into the second display infinite channel edge 142, the second display infinite channel edge 142 applies a pressure against the display module 301 of the notebook computer 103 that effectively attaches the second display infinite channel edge 142 to the display module 301 of the notebook computer 103.

In the first potential embodiment of the disclosure, the second display ledge 182 and the second closed display lateral face 162 are formed from a thermoplastic elastomeric polymer.

The third display infinite channel edge 143 is an infinite channel edge that is formed between the second display vertex and the third display vertex 173 of the display pan 111. The third display infinite channel edge 143 is an elastic structure. The third display infinite channel edge 143 has the structure of an illiterate c-channel. The third display infinite channel edge 143 is bounded by the display closed face 122, the third closed display lateral face 163, and the third display ledge 183. The display module 301 inserts between the display closed face 122 along a first face of the display module 301 and the third display ledge 183.

The third display infinite channel edge 143 acts as a spring. Specifically, when a display module 301 of the notebook computer 103 inserts into the hollow interior of the third display infinite channel edge 143, the third display ledge 183, and the third closed display lateral face 163 deform such in a direction such that the inner diameter of the prism structure of the third display infinite channel edge 143 increases. The third display ledge 183 and the third closed display lateral face 163 applies a counterforce that attempts to return the third display infinite channel edge 143 to its original positions. When the display module 301 of the notebook computer 103 inserts into the third display infinite channel edge 143, the third display infinite channel edge 143 applies a pressure against the display module 301 of the notebook computer 103 that effectively attaches the third display infinite channel edge 143 to the display module 301 of the notebook computer 103.

In the first potential embodiment of the disclosure, the third display ledge 183 and the third closed display lateral face 163 are formed from a thermoplastic elastomeric polymer.

The digital shell 102 forms the protected space that encloses the digital module 302 of the notebook computer 103. The digital module 302 inserts into the digital shell 102. The digital shell 102 is a rigid structure. The digital shell 102 contains the digital module 302. The digital shell 102 is formed with all apertures and form factors necessary to allow the digital shell 102 to accommodate the use and operation of the digital module 302 and the notebook computer 103. Methods to form a digital shell 102 suitable for the purposes described in this disclosure are well-known and documented in the mechanical arts. The digital shell 102 comprises a digital pan 211, a plurality of digital ledges 212, a first digital infinite channel edge 241, and a second digital infinite channel edge 242.

The digital pan 211 is a prism-shaped structure. The digital pan 211 has a semi-enclosed pan structure. The digital pan 211 is a rigid structure. The digital pan 211 forms the boundaries of the protected space that encloses the digital module 302. The digital pan 211 comprises a digital open face 221, a digital closed face 222, a plurality of digital lateral faces 223, and a plurality of digital vertices 224.

The digital open face 221 is the open face of the semi-enclosed pan structure of the digital pan 211.

The digital closed face 222 is the closed face of the semi-enclosed pan structure of the digital pan 211. The digital closed face 222 is the face of the prism structure of the digital pan 211 that is distal from the digital open face 221. The digital closed face 222 further comprises a digital asset tracking window 251 and one or more cooling ports 252. The digital asset tracking window 251 is a transparent structure that is formed through the digital closed face 222 of the digital pan 211. The digital asset tracking window 251 provides visibility to the exterior surface of the digital module 302 such that any inventory tags applied to the notebook computer 103 are readily visible through the digital asset tracking window 251. Each of the one or more cooling ports 252 is a fluid port that allows any cooling equipment associated with the digital module 302 to circulate air through the digital module 302.

Each of the plurality of digital lateral faces 223 is a lateral face of the prism structure of the digital pan 211. Each of the plurality of digital lateral faces 223 forms a face between the digital open face 221 and the digital closed face of the digital pan 211. The plurality of digital lateral faces 223 comprises a first closed digital lateral face 261, a second closed digital lateral face 262, a third closed digital lateral face 263, and a digital open lateral face 264.

The first closed digital lateral face 261 forms a closed lateral face of the semi-enclosed pan structure of the digital pan 211. The first closed digital lateral face 261 is positioned between the digital open lateral face 264 and the second closed digital lateral face 262 of the digital pan 211.

The second closed digital lateral face 262 forms a closed lateral face of the semi-enclosed pan structure of the digital pan 211. The second closed digital lateral face 262 is positioned between the first closed digital lateral face 261 and the third closed digital lateral face 263 of the digital pan 211.

The third closed digital lateral face 263 forms a closed lateral face of the semi-enclosed pan structure of the digital pan 211. The third closed digital lateral face 263 is positioned between the second closed digital lateral face 262 and the digital open lateral face 264 of the digital pan 211.

The digital open lateral face 264 forms the open face of the semi-enclosed pan structure of the digital pan 211. The digital module 302 inserts into the digital shell 102 through the digital open lateral face 264.

Each of the plurality of digital vertices 224 is a vertex of the prism structure that forms the digital pan 211. The plurality of digital vertices 224 is a brink formed at a joint formed by the digital open face 221, the digital closed face 222, and two lateral faces selected from the plurality of digital lateral faces 223. The plurality of digital vertices 224 comprises a first digital vertex 271, a second digital vertex 272, a third digital vertex 273, and a fourth digital vertex 274. The first digital vertex 271 is the vertex formed at the brink formed by the digital closed face 222, the first closed digital lateral face 261, the second closed digital lateral face 262, the first digital ledge 281, and the second digital ledge 282. The second digital vertex 272 is the vertex formed at the brink formed by the digital closed face 222, the second closed digital lateral face 262, the third closed digital lateral face 263, the second digital ledge 282, and the third digital ledge 283. The third digital vertex 273 is the vertex formed at the brink formed by the digital closed face 222, the third closed digital lateral face 263, and the digital open lateral face 264. The fourth digital vertex 274 is the vertex formed at the brink formed by the digital closed face 222, the digital open lateral face 264, and the first closed digital lateral face 261.

Each of the plurality of digital ledges 212 is a disk-shaped structure. Each of the plurality of digital ledges 212 attaches to the plurality of digital lateral faces 223 of the digital pan 211. Each of the plurality of digital ledges 212 forms an undercut ledge. The ledge and the undercut ledge are defined elsewhere in this disclosure. The plurality of digital ledges 212 projects into the digital open face 221 of the semi-enclosed pan structure of the digital pan 211 such that the plurality of digital ledges 212 form physical barriers that contain the digital module 302 within the digital pan 211.

The plurality of digital ledges 212 comprises a first digital ledge 281, a second digital ledge 282, and a third digital ledge 283.

The first digital ledge 281 is the ledge structure selected from the plurality of digital ledges 212 that is associated with the first closed digital lateral face 261. The first digital ledge 281 attaches to the free end of the first closed digital lateral face 261. The first digital ledge 281 projects perpendicularly away from the face of the first closed digital lateral face 261 towards the center of the digital open face 221 of the digital pan 211. The first digital ledge 281 is an elastic structure such that the first digital ledge 281 deforms when the digital module 302 inserts into the first digital infinite channel edge 241. The return of the first digital ledge 281 to its relaxed shape secures the digital module 302 within the first digital infinite channel edge 241.

The second digital ledge 282 is the ledge structure selected from the plurality of digital ledges 212 that is associated with the second closed digital lateral face 262. The second digital ledge 282 attaches to the free end of the second closed digital lateral face 262. The second digital ledge 282 projects perpendicularly away from the face of the second closed digital lateral face 262 towards the center of the digital open face 221 of the digital pan 211. The second digital ledge 282 is an elastic structure such that the second digital ledge 282 deforms when the digital module 302 inserts into the second digital infinite channel edge 242. The return of the second digital ledge 282 to its relaxed shape secures the digital module 302 within the second digital infinite channel edge 242.

The third digital ledge 283 is the ledge structure selected from the plurality of digital ledges 212 that is associated with the third closed digital lateral face 263. The third digital ledge 283 attaches to the free end of the third closed digital lateral face 263. The third digital ledge 283 projects perpendicularly away from the face of the third closed digital lateral face 263 towards the center of the digital open face 221 of the digital pan 211. The third digital ledge 283 is an elastic structure such that the third digital ledge 283 deforms when the digital module 302 inserts into the third digital infinite channel edge 243. The return of the third digital ledge 283 to its relaxed shape secures the digital module 302 within the third digital infinite channel edge 243.

The first digital infinite channel edge 241 is an infinite channel edge that is formed between the first digital vertex 271 and the fourth digital vertex 274 of the digital pan 211. The first digital infinite channel edge 241 is an elastic structure. The first digital infinite channel edge 241 has the structure of an illiterate c-channel. The first digital infinite channel edge 241 is bounded by the digital closed face 222, the first closed digital lateral face 261, and the first digital ledge 281. The digital module 302 inserts between the digital closed face 222 along a first face of the digital module 302 and the first digital ledge 281.

The first digital infinite channel edge 241 acts as a spring. Specifically, when a digital module 302 of the notebook computer 103 inserts into the hollow interior of the first digital infinite channel edge 241, the first digital ledge 281, and the first closed digital lateral face 261 deform such in a direction such that the inner diameter of the prism structure of the first digital infinite channel edge 241 increases. The first digital ledge 281 and the first closed digital lateral face 261 applies a counterforce that attempts to return the first digital infinite channel edge 241 to its original positions. When the digital module 302 of the notebook computer 103 inserts into the first digital infinite channel edge 241, the first digital infinite channel edge 241 applies a pressure against the digital module 302 of the notebook computer 103 that effectively attaches the first digital infinite channel edge 241 to the digital module 302 of the notebook computer 103.

In the first potential embodiment of the disclosure, the first digital ledge 281 and the first closed digital lateral face 261 are formed from a thermoplastic elastomeric polymer.

The second digital infinite channel edge 242 is an infinite channel edge that is formed between the first digital vertex 271 and the second digital vertex 272 of the digital pan 211. The second digital infinite channel edge 242 is an elastic structure. The second digital infinite channel edge 242 has the structure of an illiterate c-channel. The second digital infinite channel edge 242 is bounded by the digital closed face 222, the second closed digital lateral face 262, and the second digital ledge 282. The digital module 302 inserts between the digital closed face 222 along a first face of the digital module 302 and the second digital ledge 282.

The second digital infinite channel edge 242 acts as a spring. Specifically, when a digital module 302 of the notebook computer 103 inserts into the hollow interior of the second digital infinite channel edge 242, the second digital ledge 282, and the second closed digital lateral face 262 deform such in a direction such that the inner diameter of the prism structure of the second digital infinite channel edge 242 increases. The second digital ledge 282 and the second closed digital lateral face 262 applies a counterforce that attempts to return the second digital infinite channel edge 242 to its original positions. When the digital module 302 of the notebook computer 103 inserts into the second digital infinite channel edge 242, the second digital infinite channel edge 242 applies a pressure against the digital module 302 of the notebook computer 103 that effectively attaches the second digital infinite channel edge 242 to the digital module 302 of the notebook computer 103.

In the first potential embodiment of the disclosure, the second digital ledge 282 and the second closed digital lateral face 262 are formed from a thermoplastic elastomeric polymer.

The third digital infinite channel edge 243 is an infinite channel edge that is formed between the second digital vertex 272 and the third digital vertex 273 of the digital pan 211. The third digital infinite channel edge 243 is an elastic structure. The third digital infinite channel edge 243 has the structure of an illiterate c-channel. The third digital infinite channel edge 243 is bounded by the digital closed face 222, the third closed digital lateral face 263, and the third digital ledge 283. The digital module 302 inserts between the digital closed face 222 along a first face of the digital module 302 and the third digital ledge 283.

The third digital infinite channel edge 243 acts as a spring. Specifically, when a digital module 302 of the notebook computer 103 inserts into the hollow interior of the third digital infinite channel edge 243, the third digital ledge 283, and the third closed digital lateral face 263 deform such in a direction such that the inner diameter of the prism structure of the third digital infinite channel edge 243 increases. The third digital ledge 283 and the third closed digital lateral face 263 applies a counterforce that attempts to return third digital infinite channel edge 243 to its original positions. When the digital module 302 of the notebook computer 103 inserts into the third digital infinite channel edge 243, the third digital infinite channel edge 243 applies a pressure against the digital module 302 of the notebook computer 103 that effectively attaches the third digital infinite channel edge 243 to the digital module 302 of the notebook computer 103.

In the first potential embodiment of the disclosure, the third digital ledge 283 and the third closed digital lateral face 263 are formed from a thermoplastic elastomeric polymer.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Brink: As used in this disclosure, a brink refers to the edge or line formed by the intersection of a first plane or surface and a second plane or surface wherein a cant exists between the first plane or surface and the second plane or surface.

C-Channel: As used in this disclosure, the C-channel is a structure that is formed in a U-shape. The C-channel forms a prism shape with a hollow interior and an open face that forms a shape characteristic of the letter C. The open space of the C-channel is often used as a track. An illiterate C-Channel structure refers to a C-Channel structure where: a) the arms of the U-shaped structure of the C-Channel structure are not of equal distances; or b) the crossbeam of the U-shaped structure of the C-Channel structure is selected from the group consisting of a non-Euclidean structure, a curved structure, or a bent structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chevron: As used in this disclosure, chevron is a term that is used to describe an object that has the shape of a U or a V.

Clip: As used in this disclosure, a clip is a fastener that attaches to an object by gripping or clasping the object. A clip is typically spring loaded.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Inelastic Nature: As used in this disclosure, an inelastic nature refers to a flexible structure that maintains its new shape after the flexible structure has been deformed.

Free End: As used in this disclosure, a free end refers to the end of a disk, shaft, pipe, or tube that is not attached to an object.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Keyboard: As used in this disclosure, a keyboard is a panel that further comprises a plurality of buttons that are commonly referred to as keys. The keyboard is commonly used to operate devices including, but not limited to, logical devices and musical instruments.

Ledge: As used in this disclosure, a ledge is a first plate structure that projects away from a second plate structure. A ledge that projects away from, or overhangs, the second plate structure in the manner of a cantilever is referred to as an undercut ledge.

Negative Space: As used in this disclosure, negative space is a method of defining an object through the use of open or empty space as the definition of the object itself, or, through the use of open or empty space to describe the boundaries of an object.

Non-Euclidean Structure: As used in this disclosure, a non-Euclidean structure is a structure wherein an axis of the structure lies on a non-Euclidean plane or is otherwise formed with a curvature.

Notebook Computer and Tablet: As used in this disclosure, both the notebook computer and the tablet are personal data devices. The notebook computer comprises two attached but independently recognizable shells referred to as the digital module and display module. The digital module and the display module are attached using a hinge. The digital module and the display module may or may not be removably attached. The primary difference between the digital module and the display module is that the display module always contains a visual display device while the bulk of the digital processing circuitry and a keyboard will be contained in the digital module. A tablet is a notebook computer housed in a single shell. The tablet may or may not have a keyboard.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Port: As used in this disclosure, a port is an aperture formed in an object that allows fluid to flow through the boundary of the object.

Primary Difference: As used in this disclosure, a primary difference refers to a difference between two similar objects that is relevant to the creation of a patentable distinction between the two objects. The use of the term primary difference is intended to indicate that other differences that may exist between the two objects are not considered relevant to the creation of a patentable distinction within this disclosure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a boundary structure, often referred to as a guard that prevents impacts from damaging the object contained within the protected space.

Relaxed Shape: As used in this disclosure, a structure is considered to be in its relaxed state when no shear, strain, or torsional forces are being applied to the structure.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Shell: As used in this disclosure, a shell is a structure that forms an outer covering intended to contain an object. Shells are often, but not necessarily, rigid or semi-rigid structures that are intended to protect the object contained within it.

Sleeve: As used in this disclosure, a sleeve is a tube like covering that is placed over an object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Torsion Spring: As used in this disclosure, a torsion spring is a mechanical device that stores mechanical energy through an opposing torque when the mechanical device is bent or twisted. The torsion spring will return to its original relaxed shape when the twisting force is removed.

Transparent: As used in this disclosure, transparent refers to a material that allows light to pass through the material without significant scattering such that an object can be clearly seen through the material.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm. The first arm and the second arm project away from the crossbeam in the manner of a cantilever. An illiterate U-shaped structure is a U-shaped structure where the span of the length of the first arm does not equal the span of the length of the second arm With respect to the above description, it is to be realized that the optimum dimensional relationship for the various components of the invention described above and in FIGS. 1 through 16 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective computer case comprising
a display shell and a digital shell;
wherein the protective computer case is configured for use with a notebook computer;
wherein the display shell forms a first protected space around a display module of said notebook computer;
wherein the digital shell forms a second protected space around a digital module of said notebook computer;
wherein the protective computer case simultaneously encloses the display module and the digital module such that the display module continues to rotate relative to the digital module while the display module and the digital module are protected by the protective computer case;
wherein the display shell comprises a display pan, a plurality of display ledges, a first display infinite channel edge, a second display infinite channel edge, and a third display infinite channel edge;
wherein the digital shell comprises a digital pan, a plurality of digital ledges, a first digital infinite channel edge, and a second digital infinite channel edge;
wherein the plurality of digital ledges comprises a first digital ledge, a second digital ledge, and a third digital ledge;
wherein the notebook computer is a rotating device that is protected by the display shell and the digital shell;
wherein a hinge of said notebook computer attaches the display module to the digital module such that the display module rotates relative to the digital module;
wherein the display shell comprises a first plurality of infinite channel edges that secure the display module within the display shell;
wherein the digital shell comprises a second plurality of infinite channel edges that secure the digital module within the digital shell;
wherein the display shell is a rigid structure;
wherein the display shell contains the display module;
wherein the display module inserts into the display shell;
wherein the digital shell is a rigid structure;
wherein the digital shell contains the digital module;
wherein the digital module inserts into the digital shell;
wherein the display pan forms the boundaries of the protected space that encloses the display module;
wherein each of the plurality of display ledges attaches to the display pan;
wherein the first display infinite channel edge is an elastic structure;
wherein the first display infinite channel edge has the structure of an illiterate c-channel;
wherein the first display infinite channel edge acts as a spring;
wherein the second display infinite channel edge is an elastic structure;
wherein the second display infinite channel edge has the structure of an illiterate c-channel;
wherein the second display infinite channel edge acts as a spring;
wherein the third display infinite channel edge is an elastic structure;
wherein the third display infinite channel edge has the structure of an illiterate c-channel;
wherein the third display infinite channel edge acts as a spring;
wherein the digital pan forms the boundaries of the protected space that encloses the digital module;
wherein each of the plurality of digital ledges attaches to the digital pan;
wherein each of the plurality of digital ledges attaches to the digital pan;
wherein the first digital infinite channel edge is an elastic structure;
wherein the first digital infinite channel edge has the structure of an illiterate c-channel;
wherein the first digital infinite channel edge acts as a spring;
wherein the second digital infinite channel edge is an elastic structure;
wherein the second digital infinite channel edge has the structure of an illiterate c-channel;
wherein the second digital infinite channel edge acts as a spring;
wherein the third digital infinite channel edge is an elastic structure;
wherein the third digital infinite channel edge has the structure of an illiterate c-channel;
wherein the third digital infinite channel edge acts as a spring;
wherein the display pan has a semi-enclosed pan structure;
wherein the display pan is a rigid structure;
wherein the digital pan has a semi-enclosed pan structure;
wherein the digital pan is a rigid structure;
wherein the display pan comprises a display open face, a display closed face, a plurality of display lateral faces, and a plurality of display vertices;
wherein the display open face is the open face of the semi-enclosed pan structure of the display pan;
wherein the display closed face is the closed face of the semi-enclosed pan structure of the display pan;
wherein the display closed face is the face of the display pan that is distal from the display open face;
wherein each of the plurality of display lateral faces is a lateral face of the display pan;
wherein each of the plurality of display lateral faces forms a face between the display open face and the display closed face of the display pan;
wherein each of the plurality of display vertices is a vertex of the display pan;
wherein the plurality of display vertices is a brink formed at a joint formed by the display open face, the display closed face, and two lateral faces selected from the plurality of display lateral faces;
wherein the digital pan comprises a digital open face, a digital closed face, a plurality of digital lateral faces, and a plurality of digital vertices;
wherein the digital open face is the open face of the semi-enclosed pan structure of the digital pan;
wherein the digital closed face is the closed face of the semi-enclosed pan structure of the digital pan;
wherein the digital closed face is the face of the digital pan that is distal from the digital open face;
wherein each of the plurality of digital lateral faces is a lateral face of the digital pan;
wherein each of the plurality of digital lateral faces forms a face between the digital open face and the digital closed face of the digital pan;
wherein each of the plurality of digital vertices is a vertex of the digital pan;

wherein the plurality of digital vertices is a brink formed at a joint formed by the digital open face, the digital closed face, and two lateral faces selected from the plurality of digital lateral faces;

wherein the plurality of display lateral faces comprises a first closed display lateral face, a second closed display lateral face, a third closed display lateral face, and a display open lateral face;

wherein the first closed display lateral face forms a closed lateral face of the semi-enclosed pan structure of the display pan;

wherein the first closed display lateral face is positioned between the display open lateral face and the second closed display lateral face of the display pan;

wherein the second closed display lateral face forms a closed lateral face of the semi-enclosed pan structure of the display pan;

wherein the second closed display lateral face is positioned between the first closed display lateral face and the third closed display lateral face of the display pan;

wherein the third closed display lateral face forms a closed lateral face of the semi-enclosed pan structure of the display pan;

wherein the third closed display lateral face is positioned between the second closed display lateral face and the display open lateral face of the display pan;

wherein the display open lateral face forms the open face of the semi-enclosed pan structure of the display pan;

wherein the display module inserts into the display shell through the display open lateral face;

wherein the plurality of digital lateral faces comprises a first closed digital lateral face, a second closed digital lateral face, a third closed digital lateral face, and a digital open lateral face;

wherein the first closed digital lateral face forms a closed lateral face of the semi-enclosed pan structure of the digital pan;

wherein the first closed digital lateral face is positioned between the digital open lateral face and the second closed digital lateral face of the digital pan;

wherein the second closed digital lateral face forms a closed lateral face of the semi-enclosed pan structure of the digital pan;

wherein the second closed digital lateral face is positioned between the first closed digital lateral face and the third closed digital lateral face of the digital pan;

wherein the third closed digital lateral face forms a closed lateral face of the semi-enclosed pan structure of the digital pan;

wherein the third closed digital lateral face is positioned between the second closed digital lateral face and the digital open lateral face of the digital pan;

wherein the digital open lateral face forms the open face of the semi-enclosed pan structure of the digital pan;

wherein the digital module inserts into the digital shell through the digital open lateral face;

wherein the plurality of display vertices comprises a first display vertex, a second display vertex, a third display vertex, and a fourth display vertex;

wherein the first display vertex is the vertex formed at the brink formed by the display closed face, the first closed display lateral face, the second closed display lateral face, a first display ledge, and a second display ledge;

wherein the second display vertex is the vertex formed at the brink formed by the display closed face, the second closed display lateral face, the third closed display lateral face, the second display ledge, and the third display ledge;

wherein the third display vertex is the vertex formed at the brink formed by the display closed face, the third closed display lateral face, and the display open lateral face;

wherein the fourth display vertex is the vertex formed at the brink formed by the display closed face, the display open lateral face, and the first closed display lateral face;

wherein the plurality of digital vertices comprises a first digital vertex, a second digital vertex, a third digital vertex, and a fourth digital vertex;

wherein the first digital vertex is the vertex formed at the brink formed by the digital closed face, the first closed digital lateral face, the second closed digital lateral face, the first digital ledge, and the second digital ledge;

wherein the second digital vertex is the vertex formed at the brink formed by the digital closed face, the second closed digital lateral face, the third closed digital lateral face, the second digital ledge, and the third digital ledge;

wherein the third digital vertex is the vertex formed at the brink formed by the digital closed face, the third closed digital lateral face, and the digital open lateral face;

wherein the fourth digital vertex is the vertex formed at the brink formed by the digital closed face, the digital open lateral face, and the first closed digital lateral face;

wherein each of the plurality of display ledges is a disk-shaped structure;

wherein each of the plurality of display ledges forms an undercut ledge;

wherein each of the plurality of display ledges attaches to the plurality of display lateral faces of the display pan;

wherein the plurality of display ledges projects into the display open face of the semi-enclosed pan structure of the display pan such that the plurality of display ledges form physical barriers that contain the display module within the display pan;

wherein each of the plurality of digital ledges is a disk-shaped structure;

wherein each of the plurality of digital ledges attaches to the plurality of digital lateral faces of the digital pan;

wherein each of the plurality of digital ledges forms an undercut ledge;

wherein the plurality of digital ledges projects into the digital open face of the semi-enclosed pan structure of the digital pan such that the plurality of digital ledges form physical barriers that contain the digital module within the digital pan;

wherein the first display ledge is the ledge structure selected from the plurality of display ledges that is associated with the first closed display lateral face;

wherein the first display ledge attaches to the free end of the first closed display lateral face;

wherein the first display ledge projects perpendicularly away from the face of the first closed display lateral face towards the center of the display open face of the display pan;

wherein the first display ledge is an elastic structure such that the first display ledge deforms when the display module inserts into the first display infinite channel edge;

wherein the second display ledge is the ledge structure selected from the plurality of display ledges that is associated with the second closed display lateral face;

wherein the second display ledge attaches to the free end of the second closed display lateral face;
wherein the second display ledge projects perpendicularly away from the face of the second closed display lateral face towards the center of the display open face of the display pan;
wherein the second display ledge is an elastic structure such that the second display ledge deforms when the display module inserts into the second display infinite channel edge;
wherein the third display ledge is the ledge structure selected from the plurality of display ledges that is associated with the third closed display lateral face;
wherein the third display ledge attaches to the free end of the third closed display lateral face;
wherein the third display ledge projects perpendicularly away from the face of the third closed display lateral face towards the center of the display open face of the display pan;
wherein the third display ledge is an elastic structure such that the third display ledge deforms when the display module inserts into the third display infinite channel edge.

2. The protective computer case according to claim 1
wherein the first digital ledge is the ledge structure selected from the plurality of digital ledges that is associated with the first closed digital lateral face;
wherein the first digital ledge attaches to the free end of the first closed digital lateral face;
wherein the first digital ledge projects perpendicularly away from the face of the first closed digital lateral face towards the center of the digital open face of the digital pan;
wherein the first digital ledge is an elastic structure such that the first digital ledge deforms when the digital module inserts into the first digital infinite channel edge;
wherein the return of the first digital ledge to its relaxed shape secures the digital module within the first digital infinite channel edge;
wherein the second digital ledge is the ledge structure selected from the plurality of digital ledges that is associated with the second closed digital lateral face;
wherein the second digital ledge attaches to the free end of the second closed digital lateral face;
wherein the second digital ledge projects perpendicularly away from the face of the second closed digital lateral face towards the center of the digital open face of the digital pan;
wherein the second digital ledge is an elastic structure such that the second digital ledge deforms when the digital module inserts into the second digital infinite channel edge;
wherein the return of the second digital ledge to its relaxed shape secures the digital module within the second digital infinite channel edge;
wherein the third digital ledge is the ledge structure selected from the plurality of digital ledges that is associated with the third closed digital lateral face;
wherein the third digital ledge attaches to the free end of the third closed digital lateral face;
wherein the third digital ledge projects perpendicularly away from the face of the third closed digital lateral face towards the center of the digital open face of the digital pan;
wherein the third digital ledge is an elastic structure such that the third digital ledge deforms when the digital module inserts into the third digital infinite channel edge;
wherein the return of the third digital ledge to its relaxed shape secures the digital module within the third digital infinite channel edge.

3. The protective computer case according to claim 2
wherein the first display infinite channel edge is an infinite channel edge that is formed between the first display vertex and the fourth display vertex of the display pan;
wherein the first display infinite channel edge is bounded by the display closed face, the first closed display lateral face, and the first display ledge;
wherein the display module inserts between the display closed face along a first face of the display module and the first display ledge;
wherein the first display ledge and the first closed display lateral face applies a counterforce that attempts to return the first display infinite channel edge to its original positions;
wherein the second display infinite channel edge is an infinite channel edge that is formed between the first display vertex and the second display vertex of the display pan;
wherein the second display infinite channel edge is bounded by the display closed face, the second closed display lateral face, and the second display ledge;
wherein the display module inserts between the display closed face along a first face of the display module and the second display ledge;
wherein the second display ledge and the second closed display lateral face applies a counterforce that attempts to return the second display infinite channel edge to its original positions;
wherein the third display infinite channel edge is an infinite channel edge that is formed between the second display vertex and the third display vertex of the display pan;
wherein the third display infinite channel edge is bounded by the display closed face, the third closed display lateral face, and the third display ledge;
wherein the display module inserts between the display closed face along a first face of the display module and the third display ledge;
wherein the third display ledge and the third closed display lateral face applies a counterforce that attempts to return the third display infinite channel edge to its original positions.

4. The protective computer case according to claim 3
wherein the first digital infinite channel edge is an infinite channel edge that is formed between the first digital vertex and the fourth digital vertex of the digital pan;
wherein the first digital infinite channel edge is bounded by the digital closed face, the first closed digital lateral face, and the first digital ledge;
wherein the digital module inserts between the digital closed face along a first face of the digital module and the first digital ledge;
wherein the first digital ledge and the first closed digital lateral face applies a counterforce that attempts to return the first digital infinite channel edge to its original positions;
wherein the second digital infinite channel edge is an infinite channel edge that is formed between the first digital vertex and the second digital vertex of the digital pan;

wherein the second digital infinite channel edge is bounded by the digital closed face, the second closed digital lateral face, and the second digital ledge;

wherein the digital module inserts between the digital closed face along a first face of the digital module and the second digital ledge;

wherein the second digital ledge and the second closed digital lateral face applies a counterforce that attempts to return the second digital infinite channel edge to its original positions;

wherein the third digital infinite channel edge is an infinite channel edge that is formed between the second digital vertex and the third digital vertex of the digital pan;

wherein the third digital infinite channel edge is bounded by the digital closed face, the third closed digital lateral face, and the third digital ledge;

wherein the digital module inserts between the digital closed face along a first face of the digital module and the third digital ledge;

wherein the third digital ledge and the third closed digital lateral face applies a counterforce that attempts to return third digital infinite channel edge to its original positions.

5. The protective computer case according to claim 4
wherein the display closed face further comprises a display asset tracking window;

wherein the display asset tracking window is a transparent structure that is formed through the display closed face of the display pan;

wherein the display asset tracking window provides visibility to the exterior surface of the display module.

6. The protective computer case according to claim 5
wherein the digital closed face further comprises a digital asset tracking window and one or more cooling ports;

wherein the digital asset tracking window is a transparent structure that is formed through the digital closed face of the digital pan;

wherein the digital asset tracking window provides visibility to the exterior surface of the digital module such that any inventory tags applied to the notebook computer are readily visible through the digital asset tracking window;

wherein each of the one or more cooling ports is a fluid port that allows any cooling equipment associated with the digital module to circulate air through the digital module.

* * * * *